Aug. 14, 1962 R. J. CARROLL ETAL 3,049,091
RELEASE AND EJECTION MECHANISM FOR
AUTOMATIC DYE MARKER SYSTEM
Filed Oct. 11, 1960
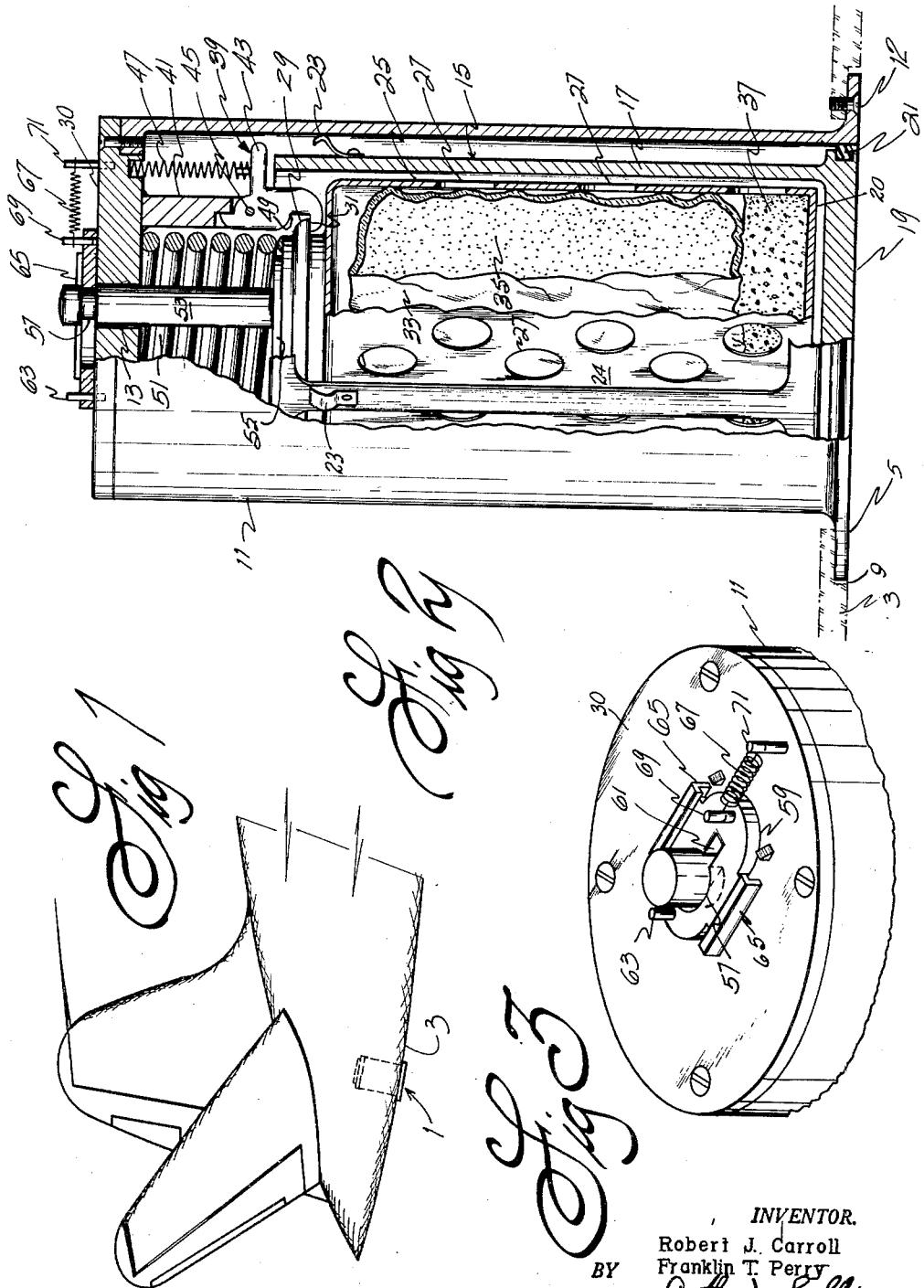
INVENTOR.
Robert J. Carroll
Franklin T. Perry
BY
ATTORNEYS

United States Patent Office 3,049,091
Patented Aug. 14, 1962

3,049,091
RELEASE AND EJECTION MECHANISM FOR AUTOMATIC DYE MARKER SYSTEM
Robert J. Carroll, Newtown Square, Pa., and Franklin T. Perry, Stratford, N.J.; said Carroll assignor to the United States of America as represented by the Secretary of the Navy
Filed Oct. 11, 1960, Ser. No. 62,060
3 Claims. (Cl. 116—124)
(Granted under Title 35, U.S. Code (1952), sec. 266)

The invention described herein may be manufactured and used by or for the Government of the United States of America for governmental purposes without the payment of any royalties thereon or therefor.

This invention relates to equipment for marking the location of craft which may have sunk below the surface of the water. It is particularly applicable to surface vessels or aircraft.

Generally, this device comprises a buoyant marker which is mounted on an aircraft so that an exposed portion thereof will be in actual contact with the water in the event of a sea crash landing. The device is constructed in such a manner that water pressure on said exposed portion will automatically cause the ejection of the buoyant marker from the aircraft.

It is one object of this invention to provide an improved ejection mechanism having a releasable buoy unit which is automatically ejected from the craft upon submerging thereof, which buoy may contain a quantity of dye for coloring the water surface.

A further object of the invention is to provide a compact, light weight, inexpensive and reliable crash marking buoy which is adapted to be automatically ejected from an aircraft marker making a forced landing at sea when the aircraft is submerged to a predetermined depth in water.

A further object of the invention is to provide a buoy which will float along with the survivors of an air crash and which will release a dye at a predetermined rate on the surface of the sea thereby making it easier for air-sea rescue teams to spot the survivors.

A further object of the invention is to provide an improved ejection mechanism and marker buoy which can be mounted in the aircraft fuselage flush with the skin thereof in such a manner that the streamlining of the aircraft is not affected thereby.

Various other objects and advantages will be apparent from the following description of one embodiment of the invention and the novel features will be particularly pointed out hereinafter in connection with the appended claims.

In the drawings accompanying and forming a part of this specification:

FIG. 1 is a perspective view of a section of an aircraft on which our invention is illustrated.

FIG. 2 is a partial longitudinal sectional view with parts broken away of the invention showing the same in assembled condition.

FIG. 3 is a top plan view in perspective showing the release mechanism in more detail.

Referring more particularly to FIGS. 1 and 2 of the drawing, the ejector-buoy unit 1 is secured to the airplane's skin 3 and is preferably mounted in an out of the way location to prevent entanglement of the buoy when it is released. The skin 3 is formed with an aperture 9 preferably circular. An elongated first cylindrical housing 11 having a flange or mounting platform 5 integral therewith, is positioned inside of the aperture so that the flange is flush with the outer surface of the skin 3 of the aircraft and is securely affixed thereto by rivets 12 or the like. The housing 11 is positioned so that its outer surface is flushed with the outer surface of the skin of the fuselage as shown.

A closure member 30 is removably fitted to one end of the housing 11 with screws, rivets or the like.

Mounted within the housing 11 is a buoy assembly 15. The buoy assembly consists of a second cylindrical housing 17 having a base member 19 integral therewith at one end. The cylinder is telescopically positioned inside of the housing in coaxial relationship so that the base member 19 is flushed with the open end of the said housing as shown in FIG. 2.

A tight tubular seal 21 which may be of flexible rubber or the like is set in a groove in the peripheral portion of the base member 19. This seal prevents the possibility of leakage past the base member. The fingers 23 are placed around the outside of housing 17 to enable it to slide more easily.

A canister 25 having an integral bottom 20, a wall member 24 having perforations 27 therein, and being opened at the top, is disposed within the said second housing 17. The top of the canister is equipped with a removable cap 29 which has a lip 31. A sack 33 is located inside of the canister 25 and holds a suitable dye material 35 for the purpose of coloring the water when the buoy assembly is ejected from the housing. A foam plastic 37 or other suitable bouyant material is placed on the bottom 20 of the canister in order to enable it to float upright in the water after ejection from the housing 11. The dye gradually dissolves and leaches out from the membrane 33 into the water whereby it produces a distinctive marking in the said water which persists for a considerable length of time.

Three triggering units 39 are attached by soldering or the like to the inside of the closure member 30. These units are spaced 120° apart to make it easier to position the said second cylindrical housing 17 inside of the said first housing. The number of triggering units is not critical. These triggers consists of a U-shaped member 41, an L-shaped latch member 43 is pivotally mounted to the U-shaped member by a pin 45. The latch member is biased clockwise by spring means 47 connected to the closure member 30. The inner side of the latch member 43 possesses a groove 49 which engages the lip 31 on the canister so as to hold the buoy in locked relationship inside of the said housing 11.

A helical compression spring 51 requiring 125 lbs. of force to compress it, is positioned in the top of the housing 11 between the three triggering units 39 and abuts against the cap 29 attached to the canister 25. This spring can be adjusted to operate in response to a desired pressure upon base member 19. This is generally arranged for activation under hydrostatic pressure of from three to five feet of water.

A locking tubular member 53, being flared at its bottom 55, and having a groove 57, passes through the small aperture 13 in the closure member 30 and rests against the cap 29. Two L-shaped members 65 are soldered to the top of the housing as shown in FIG. 3. A latch member 59 having a key-shaped slot 61 is positioned on the top of the housing between the L-shaped members 65. The latch member 59 slides in the grooves of the L-shaped members 65 until the narrow part of the key-shaped slot 61 engages the groove 57 in the pin 53. The cotter pin 63 locks pin 53 in this position and prevents movement of the spring 51. When the airplane is in flight, the cotter pin 65 is removed and the latch member 59 is pulled back by action of spring 67 which is connected to the two pins 69 and 71, respectively. The mechanism is now cocked for operation.

Operation of the ejection mechanism is automatic. When the airplane equipped with the improved marker is forced down at sea and becomes submerged, water pushes against the member 19. Upon exposure to the water member 19 and the housing 17 are simultaneously pushed upward into the housing 11. The edge of the housing 17 pushes against the L-shaped latch members 43 causing them to pivot on tubular member 45 against the bias of spring 47. This action causes the grooves 49 to become disengaged from the lip 31 on the cap 29. Whereupon the spring 51, which has been compressed by the action of housing 17, ejects the housing containing the canister 25 from the housing 11. Due to the buoyant material 37 in the bottom of the canister, it floats upright in the water and discharges the dye as mentioned above. The dye will float along with the survivors of the crash, making it easier for search planes to spot them.

The invention in its broader aspects is not limited to the specific mechanisms shown and described but departures may be made therefrom within the scope of the accompanying claims without departing from the principles of the invention and without sacrificing its chief advantages.

What is claimed is:

1. A crash marker device for marking the area in which an aircraft has submerged itself in a body of water, said device comprising a first cylindrical housing which is suitably mounted on the aircraft; a closure member removably mounted to one end of said first housing, said closure member being formed with an aperture therein; a second cylindrical housing having an integral base member at one end thereof, said second housing being slidably mounted inside of the first housing whereby its base member is positioned inside of the first housing at one end of the said first housing opposite the closure member; sealing means attached to said base member for forming a fluid seal between said base member and said first housing; a canister having an integral bottom, a wall member having perforations therein, and an open top, disposed within the said second housing so that the bottom of the canister rests upon the said base member of the second cylindrical housing; a cap, being formed with a lip around the periphery thereof, removably fitted in the open top of the canister; buoyant means placed on the bottom of the canister; a sack of suitable marking dye placed in the canister on top of the buoyant means; three triggering means permanently affixed to the said closure member and spaced equidistant from one another, said triggering means being adaptable to engage the lip on the cap of the canister whereby the canister is locked inside of the said first housing; a spring centered between the three triggering means and normally held compressed between the cap attached to the canister and the said closure member whereby when the aircraft plunges into a body of water, the water presses against the said base member on the second cylindrical housing and pushes the said housing along with the canister toward the closure member causing the triggering means to be disengaged from the lip of the cap on the canister whereby the compressed spring ejects both the said second cylindrical housing and canister into the water whereupon the canister floats in the water as the dye leaches out through the sack and passes through the perforations in the wall of the canister so as to color the water.

2. A device according to claim 1 wherein the three triggering means comprises a U-shaped member having a base and two legs integral therewith, said U-shaped member positioned inside of the first cylindrical housing so that the base is permanently affixed to the said closure member with the legs depending downwardly therefrom into the said first cylindrical housing; a pin disposed between the legs of the U-shaped member and suitably connected thereto; an L-shaped latch member rotatably mounted on the pin so as to engage the lip of the said cap thereby maintaining the canister in a locked position.

3. A device according to claim 1 including a locking means for preventing the accidental release of the said spring, said locking means comprising a tubular member being formed with a groove in one extremity thereof and being flared at the other extremity thereof, said tubular member extending through the aperture in the closure member so that its flared extremity abuts against the said cap; guide means located on the closure member; latching means being formed with a key shaped groove therein and disposed between the said guide means; means located on the closure member for positioning the latching means between the guide means so that the said latching means engage the tubular member thereby preventing the triggering means from becoming disengaged from the lip of the cap located in the top of the canister.

References Cited in the file of this patent
UNITED STATES PATENTS
2,803,838    Wales _____ Aug. 27, 1957